(12) United States Patent
Mignard et al.

(10) Patent No.: US 8,669,926 B2
(45) Date of Patent: Mar. 11, 2014

(54) DRIVE SCHEME FOR A DISPLAY

(75) Inventors: Marc M. Mignard, San Jose, CA (US);
Clarence Chui, San Jose, CA (US);
Alan G. Lewis, Sunnyvale, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 163 days.

(21) Appl. No.: 13/308,427

(22) Filed: Nov. 30, 2011

(65) Prior Publication Data

US 2013/0135271 A1 May 30, 2013

(51) Int. Cl.
*G09G 3/34* (2006.01)
(52) U.S. Cl.
USPC ........... 345/85; 345/55; 345/108; 345/204; 359/290; 359/291; 359/295
(58) Field of Classification Search
USPC ............ 345/55, 85, 108, 204; 359/237–275, 359/290–295, 316
See application file for complete search history.

(56) References Cited

U.S. PATENT DOCUMENTS

| | | |
|---|---|---|
| 4,954,789 A | 9/1990 | Sampsell |
| 5,010,328 A | 4/1991 | Morris et al. |
| 5,784,189 A | 7/1998 | Bozler et al. |
| 5,877,739 A | 3/1999 | Kanbe et al. |
| 6,040,937 A | 3/2000 | Miles |
| 6,574,033 B1 | 6/2003 | Chui et al. |
| 6,674,562 B1 | 1/2004 | Miles et al. |
| 6,867,896 B2 * | 3/2005 | Miles ............................ 359/290 |
| 7,042,643 B2 | 5/2006 | Miles |
| 7,123,216 B1 | 10/2006 | Miles |
| 7,158,278 B2 | 1/2007 | Kastalsky |
| 7,317,437 B2 | 1/2008 | Huang et al. |
| 7,327,510 B2 | 2/2008 | Cummings et al. |
| 7,560,299 B2 | 7/2009 | Cummings |
| 7,742,016 B2 * | 6/2010 | Hagood et al. .................. 345/55 |
| 7,889,163 B2 | 2/2011 | Chui et al. |
| 7,990,604 B2 | 8/2011 | Lee et al. |
| 2004/0008396 A1 * | 1/2004 | Stappaerts .................... 359/245 |
| 2005/0206991 A1 * | 9/2005 | Chui et al. .................... 359/290 |
| 2009/0213449 A1 | 8/2009 | Chui et al. |
| 2010/0245313 A1 | 9/2010 | Lewis et al. |

OTHER PUBLICATIONS

Patent Cooperation Treaty—Notification of Transmittal of the International Search report and the Written Opinion of the International Searching Authority or the Declaration, Mar. 25, 2013, 30 pages.
Response to Written Opinion and Amendments under Article 34 with Demand for Preliminary Examination, Sep. 26, 2013, 7 pages.

* cited by examiner

*Primary Examiner* — Jennifer Nguyen
(74) *Attorney, Agent, or Firm* — Knobbe, Martens, Olson & Bear, LLP

(57) ABSTRACT

This disclosure provides systems, methods and apparatus for writing a display image to a display having an array of pixels according to a selected driving sequence. In one aspect, display elements in a row are driven using a tall and narrow voltage pulse. This allows display elements of a row to be driven in a shorter line time.

22 Claims, 12 Drawing Sheets

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

DRIVE SCHEME FOR A DISPLAY

TECHNICAL FIELD

This disclosure relates to driving display elements in a row using a tall and narrow voltage pulse in electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

SUMMARY

The systems, methods and devices of the disclosure each have several innovative aspects, no single one of which is solely responsible for the desirable attributes disclosed herein.

One innovative aspect of the subject matter described in this disclosure can be implemented in a method for addressing a plurality of display elements. The method includes applying a first potential to the segment electrode of a first display element. The method further includes applying a second potential different from the first potential to a segment electrode of the second display element. The method further includes applying a third potential to the common electrode of both display elements for a selected duration. A potential difference produced across the first and second display elements during the selected duration has an amplitude and duration greater than a response threshold of the first display element and less than a response threshold of the second display element. The response threshold of the first display element is based at least in part on the first potential applied to the segment electrode of the first display element. The response threshold of the second display element is based at least in part on the second potential applied to the segment electrode of the second display element. The potential difference across the first display element during the selected duration has an amplitude outside of a first hysteresis window of the first display element. The potential difference across the second display element during the selected duration has an amplitude outside a second hysteresis window of the second display element. A gap between the common electrode and the segment electrode of the first display element can be based at least in part on the first potential applied to the segment electrode of the first display element. A gap between the common electrode and segment electrode of the second display element can be based at least in part on the second potential applied to the segment electrode of the second display element. Both the first display element and the second display element can be in a relaxed state prior to applying the third potential to the common electrodes of both the first and second display elements.

Another innovative aspect of the subject matter described in this disclosure can be implemented in a display apparatus. The display apparatus includes a plurality of display elements. The plurality of display elements includes at least a first and second display element. The display apparatus further includes a driver circuit. The driver circuit is configured to generate a first pulse characterized by a parameter having a value greater than a response threshold of the first display element and less than a response threshold of the second display element. The response threshold of the first display element is based at least in part on a first hold voltage applied to the first display element. The response threshold of the second display element is based at least in part on a second hold voltage applied to the second display element. The driver circuit is further configured to apply the first pulse to the plurality of display elements. The pulse has an amplitude outside of a first hysteresis window of the first display element and outside a second hysteresis window of the second display element. The driver circuit can be configured to apply the first pulse to the plurality of display elements by applying the pulse having the pulse voltage at an electrode of the first display element and the second display element.

Yet another innovative aspect of the subject matter described in this disclosure can be implemented in a display apparatus. The display apparatus includes means for generating a first pulse characterized by a parameter having a value greater than a response threshold of a first display element and less than a response threshold of a second display element. The response threshold of the first display element is based at least in part on a first hold voltage applied to the first display element. The response threshold of the second display element is based at least in part on a second hold voltage applied to the second display element. The display apparatus further includes means for applying the first pulse to the first display element and the second display element. The pulse has an amplitude outside of a first hysteresis window of the first display element and outside a second hysteresis window of the second display element. The display apparatus can further include means for applying the pulse having the pulse voltage at an electrode of the first display element and the second display element.

Yet another innovative aspect of the subject matter described in this disclosure can be implemented in a method for addressing a plurality of display elements. The method includes setting each segment electrode voltage in a line of display elements to one of first and second different voltage levels. The method further includes strobing a common electrode of the line of display elements with a voltage pulse. The common electrode voltage pulse has an amplitude and duration such that when applied to a display element with a segment voltage at the first level the display element does not actuate, and when applied to a display element with a segment voltage at the second level the display element does actuate. The common electrode voltage pulse further has an amplitude that would actuate both elements if applied for a sufficiently long duration. The method can further include releasing all the display elements in the line prior to the strobing step.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
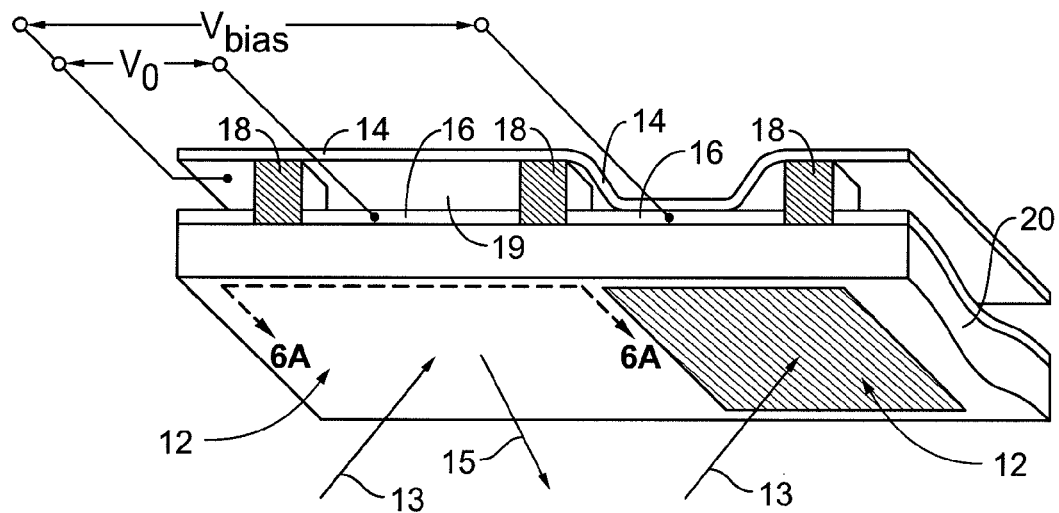
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

Drive schemes for driving display elements in a row using a large magnitude and narrow voltage pulse in electromechanical systems are described herein. The mechanical response time of certain display elements in the row are modified by adjusting a hold voltage applied to the display elements before data is written to the elements. The narrow pulse is then applied to the row of display elements. The duration of the pulse is configured to only change the state of those display elements that are modified to have a shorter mechanical response time, as the duration is longer than this shorter mechanical response time. The duration of the pulse is less than the mechanical response time of the remaining display elements and thus does not change the state of those elements. Accordingly, display elements in a row can be selected driven to change states.

Particular implementations of the subject matter described in this disclosure can be implemented to realize one or more of the following potential advantages. Utilizing these features of modifying the mechanical response times of display elements, the display elements can be addressed with a driving scheme that updates the array quickly and/or provides low power consumption. Such driving schemes are described in detail below.

One example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be on the order of 1-1000 um, while the gap 19 may be on the order of <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14a remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
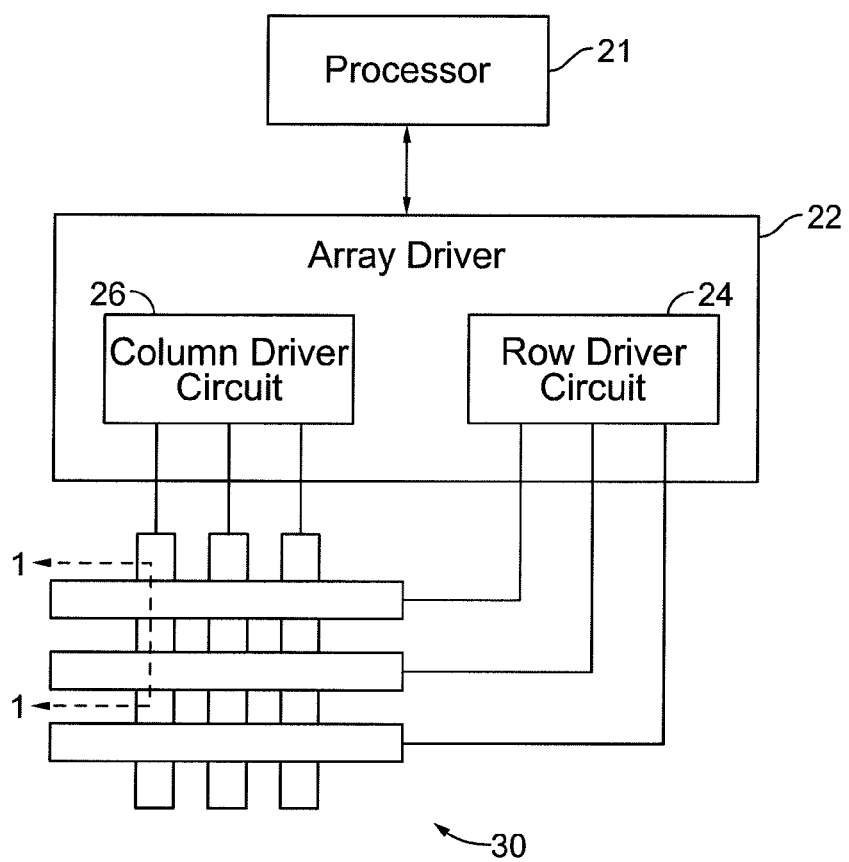
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
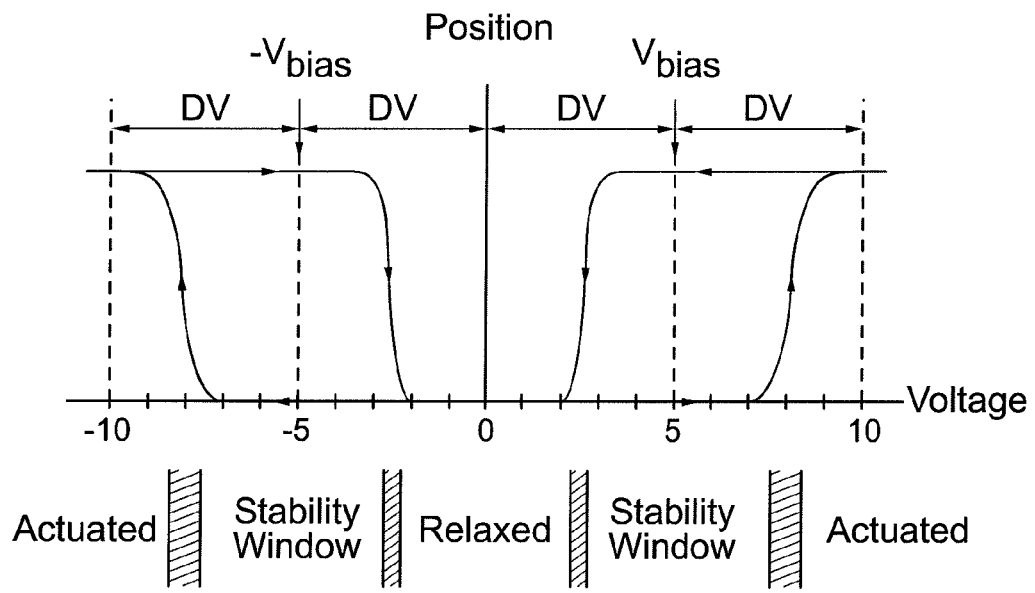
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3A shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3A. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3A, exists where there is a window of applied voltage within which the device is stable in either the relaxed or actuated state. This is referred to herein as the "hysteresis window" or "stability window." For a display array 30 having the hysteresis characteristics of FIG. 3A, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near 0 volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 3B shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 3B (as well as in the timing diagram shown in FIG. 4B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3A, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

FIG. 4A shows an example of a diagram illustrating a frame of display data in the 3×3 interferometric modulator display of FIG. 2. FIG. 4B shows an example of a timing diagram for common and segment signals that may be used to write the frame of display data illustrated in FIG. 4A. The signals can be applied to the, e.g., 3×3 array of FIG. 2, which will ultimately result in the line time 60e display arrangement illustrated in FIG. 4A. The actuated modulators in FIG. 4A are in a dark-state, i.e., where a substantial portion of the reflected light is outside of the visible spectrum so as to result in a dark appearance to, e.g., a viewer. Prior to writing the frame illustrated in FIG. 4A, the pixels can be in any state, but the write procedure illustrated in the timing diagram of FIG. 4B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 3B, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$-relax and $VC_{HOLD\_L}$-stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In the timing diagram of FIG. 4B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 4B. In some other implementations, voltages applied along common lines or segment lines may vary to account for variations in the actuation and release voltages of different modulators, such as modulators of different colors.

Figure 5A:
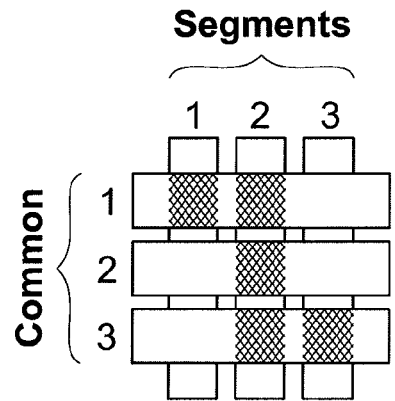
FIG. 5A shows an example of a diagram illustrating a frame of display data in the 3×3 interferometric modulator display of FIG. 2.
Figure 5B:
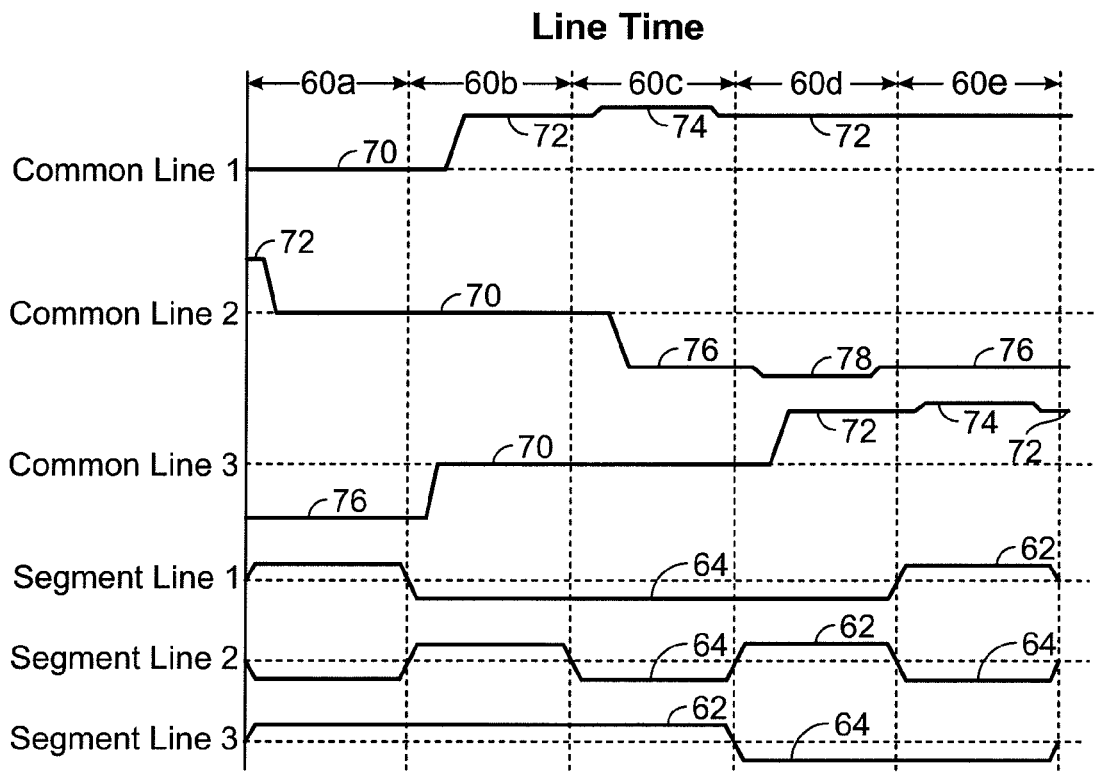
FIG. 5B shows an example of a timing diagram for common and segment signals that may be used to write the frame of display data illustrated in FIG. 4A.
Figure 6A:
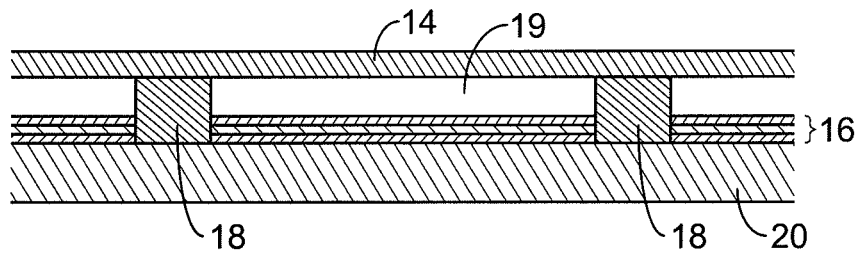
FIG. 6A shows an example of a partial cross-section of the interferometric modulator display of FIG. 1.
Figure 6B:
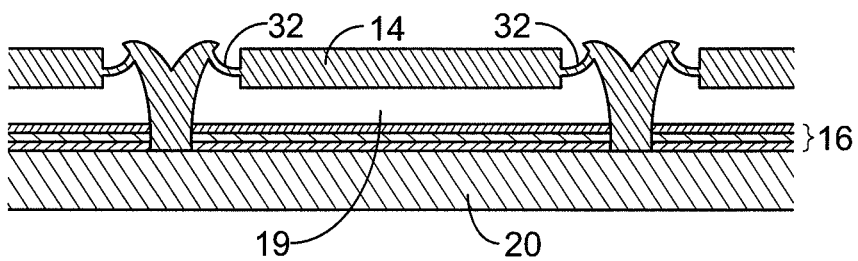
FIGS. 6B-6E show examples of cross-sections of varying implementations of interferometric modulators.
Figure 6C:
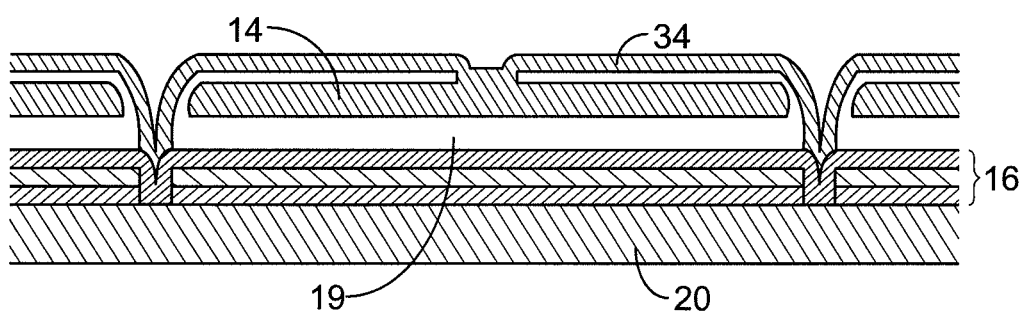
Figure 6D:
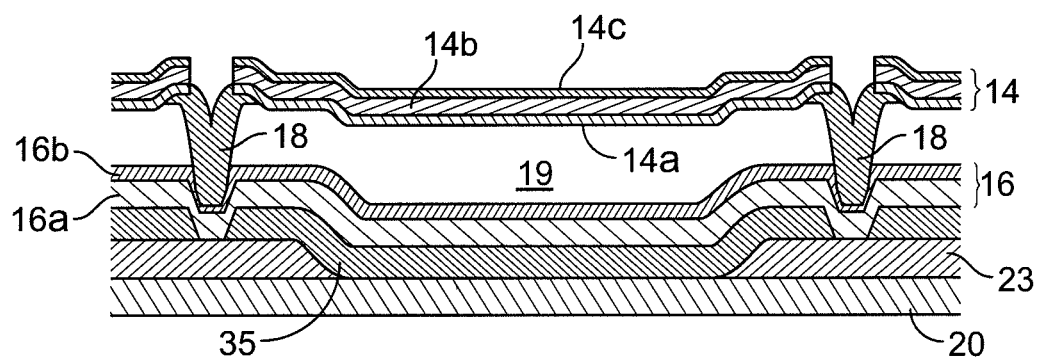
Figure 6E:
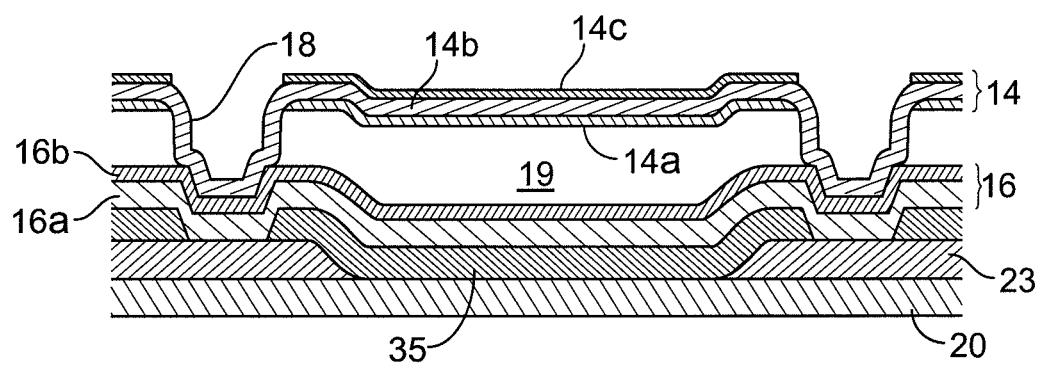

The details of the structure of interferometric modulators that operate in accordance with the principles set forth above may vary widely. For example, FIGS. 5A-5E show examples of cross-sections of varying implementations of interferometric modulators, including the movable reflective layer 14 and its supporting structures. FIG. 5A shows an example of a partial cross-section of the interferometric modulator display of FIG. 1, where a strip of metal material, i.e., the movable reflective layer 14 is deposited on supports 18 extending orthogonally from the substrate 20. In FIG. 5B, the movable reflective layer 14 of each IMOD is generally square or rectangular in shape and attached to supports at or near the corners, on tethers 32. In FIG. 5C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 5C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

FIG. 5D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an Al alloy with about 0.5% Cu, or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 5D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, $CF_4$ and/or $O_2$ for the MoCr and $SiO_2$ layers and $Cl_2$ and/or $BCl_3$ for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

FIG. 5E shows another example of an IMOD, where the movable reflective layer 14 is self supporting. In contrast with FIG. 5D, the implementation of FIG. 5E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 5E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 5A-5E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 5C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 5A-5E can simplify processing, such as, e.g., patterning.

Figure 7:
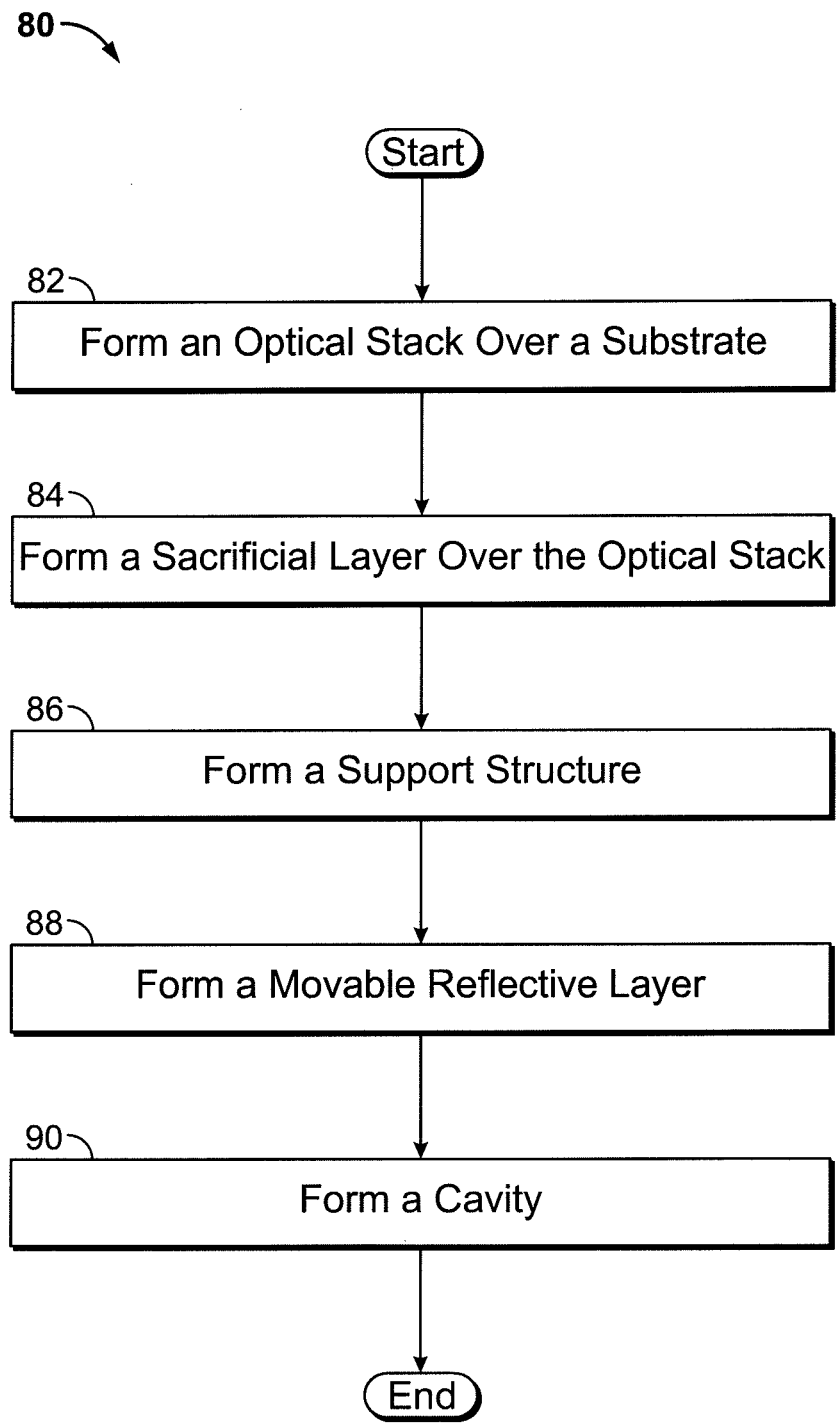
FIG. 7 shows an example of a flow diagram illustrating a manufacturing process for an interferometric modulator.
Figure 8A:
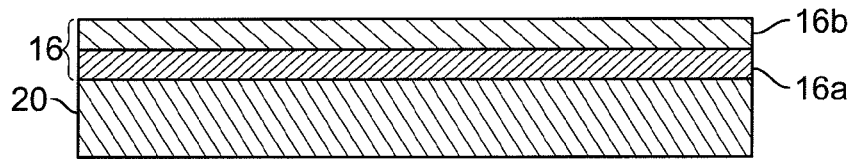
FIGS. 8A-8E show examples of cross-sectional schematic illustrations of various stages in a method of making an interferometric modulator.
Figure 8B:
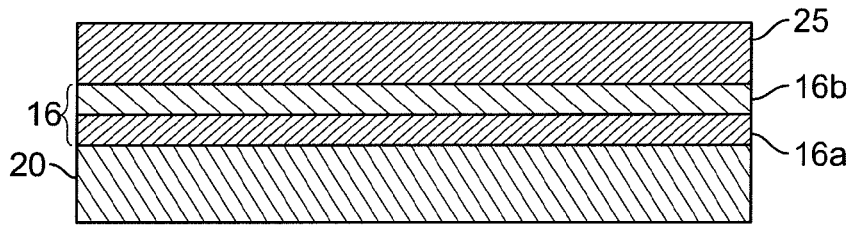
Figure 8C:
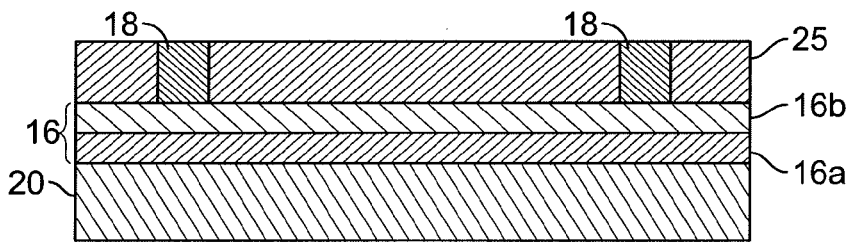
Figure 8D:
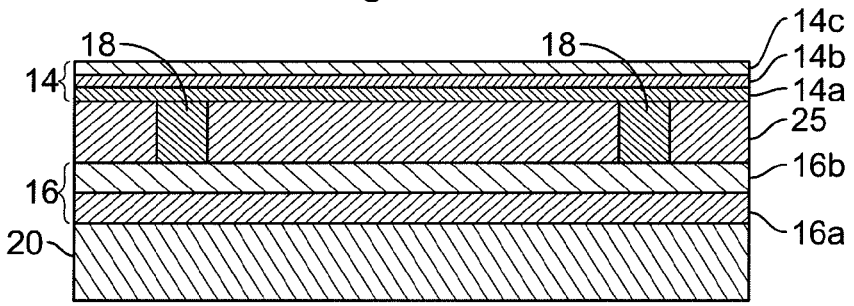
Figure 8E:
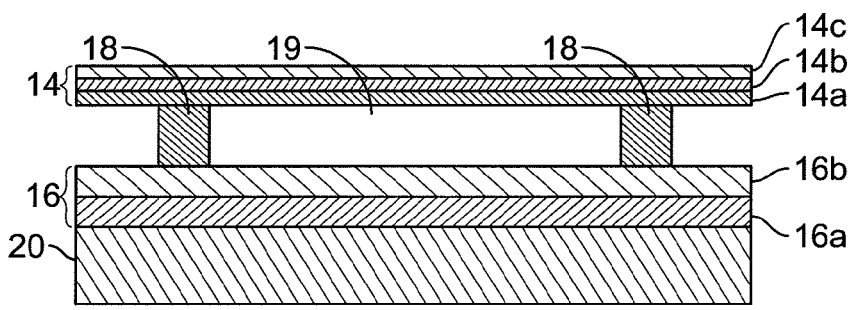

FIG. 6 shows an example of a flow diagram illustrating a manufacturing process 80 for an interferometric modulator, and FIGS. 7A-7E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 5, in addition to other blocks not shown in FIG. 6. With reference to FIGS. 1, 5 and 6, the process 80 begins at block 82 with the formation of the optical stack 16 over the substrate 20. FIG. 7A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 7A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 7B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 7E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

The process 80 continues at block 86 with the formation of a support structure e.g., a post 18 as illustrated in FIGS. 1, 5 and 7C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 5A. Alternatively, as depicted in FIG. 7C, the aperture formed in the sacrificial layer 25 can extend through the sacrificial layer 25, but not through the optical stack 16. For example, FIG. 7E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 7C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

The process 80 continues at block 88 with the formation of a movable reflective layer or membrane such as the movable reflective layer 14 illustrated in FIGS. 1, 5 and 7D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 7D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 5 and 7E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9:
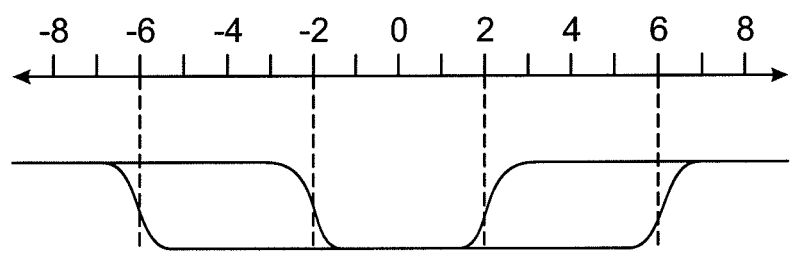
FIG. 9 shows an example hysteresis curve for display elements that can be driven with the waveforms illustrated in FIGS. 10 and 12.

For the examples described below, the hysteresis window of the interferometric modulators is assumed to be about 2-6 volts. This example is illustrated in FIG. 9, where FIG. 9 shows an example hysteresis curve for display elements that can be driven with the waveforms illustrated in FIGS. 10 and 12. As can be seen in this Figure, the actuation threshold is 6 volts and the release threshold is 2 volts. However, it should be noted that the actuation threshold and the release threshold can be varied and the range or size of the hysteresis window can also be varied while still applying the concepts discussed below. Therefore, the specific voltages discussed below are not critical, but rather are only examples used for purposes of illustration.

Interferometric modulators have an actuation time and a release time. The actuation and release times are related to the amount of time that the interferometric modulator takes to mechanically respond to the voltage applied across, or to it. Accordingly, the actuation time and the release time are the mechanical response times of the interferometric modulator. For example, when 7 volts is applied to an interferometric modulator having the characteristics shown in FIG. 9 and the interferometric modulator is in a relaxed state, it may take approximately 50 μsec for the interferometric modulator to change to an actuated state. Accordingly, if the 7 volts is applied for a duration much shorter than this 50 μsec response time, the interferometric modulator will not change states, even though the applied voltage was outside the hysteresis window. Thus, even though a voltage is applied to an interferometric modulator that is outside the hysteresis window, and therefore sufficient for actuation, it will not actuate unless the voltage is applied for a time period greater than the mechanical response time of the interferometric modulator.

Further, the mechanical response time is dependent on the voltage level applied to the interferometric modulator. For example, an interferometric modulator may have a mechanical response time of 15 μsec or less when applied a voltage of 10 volts, and a mechanical response time of 50 μsec or more when applied a voltage pulse of 7 volts. Thus, applying 10 volts to a first interferometric modulator and 7 volts to a second interferometric modulator for a duration greater than 15 μsec and less than 50 μsec will actuate the first interferometric modulator but not the second interferometric modulator. The relationship between applied voltage and actuation time is typically highly non-linear, and as the applied voltage is increased farther above the actuation threshold produces, a rapid reduction in actuation time can occur.

The mechanical response times also can be dependent on the physical properties of a given interferometric modulator. For example, depending on the material used for the various portions of the interferometric modulator (e.g., the movable reflective layer 14), the size of the defined gap 19, the size of the various portions of the interferometric modulator, etc., the mechanical response times of the interferometric modulator change. In particular, the time for mechanical response, i.e., changing from a relaxed state to an actuated state, decreases as the size of the interferometric modulator gap 19 decreases. The change in the mechanical response time is due to the shorter distance the movable reflective layer 14 needs to travel to change states. Further, the force of attraction between the movable reflective layer 14 and the optical stack 16 increases as the size of the gap 19 decreases at a given applied voltage.

As discussed above, voltages applied to the interferometric modulator within the hysteresis window do not change the current state of the interferometric modulator. However, when an interferometric modulator is relaxed, the size of the gap 19 between the movable reflective layer 14 and the optical stack 16 can change depending on the voltage applied to the interferometric modulator due to the difference in attractive force between the movable reflective layer 14 and the optical stack 16. Thus, an interferometric modulator with 5 volts applied across the electrodes will have its movable reflective layer 14 pulled slightly more toward the optical stack 16 than an interferometric modulator with 3 volts applied across the electrodes; although both will remain in an unactuated state if they are originally in the unactuated state. If two such interferometric modulators receive a voltage pulse outside the hysteresis window of 2-6 volts, such as 6 or more volts, for example, then the interferometric modulator that started at 5 volts will respond faster than the modulator that started at 3 volts.

Utilizing these features of the mechanical response times of interferometric modulators, an array of interferometric modulators can be addressed with a driving scheme that updates the array quickly and/or provides low power consumption. Such driving schemes are described in detail below.

As discussed above, between addressing periods, a hold voltage is applied to each interferometric modulator. The hold voltage is generally within a hysteresis window of the interferometric modulators. For example, where the hysteresis window of the interferometric modulator is from 2-6 volts (such as shown in FIG. 9), a hold voltage in the range of about 3-5 volts may be applied to the interferometric modulators. Further, before a row of interferometric modulators is addressed, the interferometric modulators can be cleared to a relaxed state by changing the voltage across all the modulators to an appropriate voltage below the release threshold such as −2-2 volts). The hold voltage may then be reapplied across the modulators. Assuming a hold voltage on a particular common line, voltages can be applied to the segment lines based on the desired state of the interferometric modulators along that particular common line. For segment lines associated with interferometric modulators to be placed in an actuated state, the voltage applied to the segment line can be selected such that the voltage difference between the segment line and the common line is near the actuation voltage threshold of the interferometric modulator, but still within the hysteresis window of 2-5 volts, such as 5 volts (e.g., common line 0 volts, segment line +5 volts). Further, for segment lines associated with interferometric modulators to be placed in a relaxed state, the voltage applied to the segment line can be selected such that the voltage difference between the segment line and the common line is near the middle of the hysteresis window of the interferometric modulator, such as 3 volts (e.g., common line 0 volts, segment line +3 volt).

=As discussed above, a higher voltage difference applied to the interferometric modulators to be actuated results in a lower mechanical response time for such interferometric modulators as opposed to the interferometric modulators with a lower voltage difference applied. Accordingly, to address the interferometric modulators, a voltage pulse may be applied to the common line that causes the voltage difference applied to all of the interferometric modulators to be outside of the hysteresis window of each interferometric modulator and therefore sufficient to actuate all of the interferometric modulators of that row. To selectively actuate the modulators, this pulse can be applied for a duration greater than the mechanical response time of the interferometric modulators to be actuated, but less than the mechanical response time of the interferometric modulators selected to stay in a relaxed state. Accordingly, the interferometric modulators to be actuated are actuated, and the interferometric modulators to remain in a relaxed state remain in the relaxed state even though all of the interferometric modulators along the common line have an applied voltage that is sufficient for them to be actuated. Because the voltage is applied for a short enough time period, the actuated interferometric modulators will be only the interferometric modulators that earlier had a voltage difference near the actuation threshold.

According to this scheme, larger pulse voltages can be used to drive the interferometric modulators to the desired state as all interferometric modulators in the row can be driven with a voltage outside of the hysteresis window without all of the interferometric modulators actuating. As discussed above, the higher voltage decreases the mechanical response time of the interferometric modulators, which is tied to the line time for addressing the interferometric modulators. Thus, the line time to address the interferometric modulators can be reduced and therefore a frame of image data can be written in a shorter time.

Figure 10:
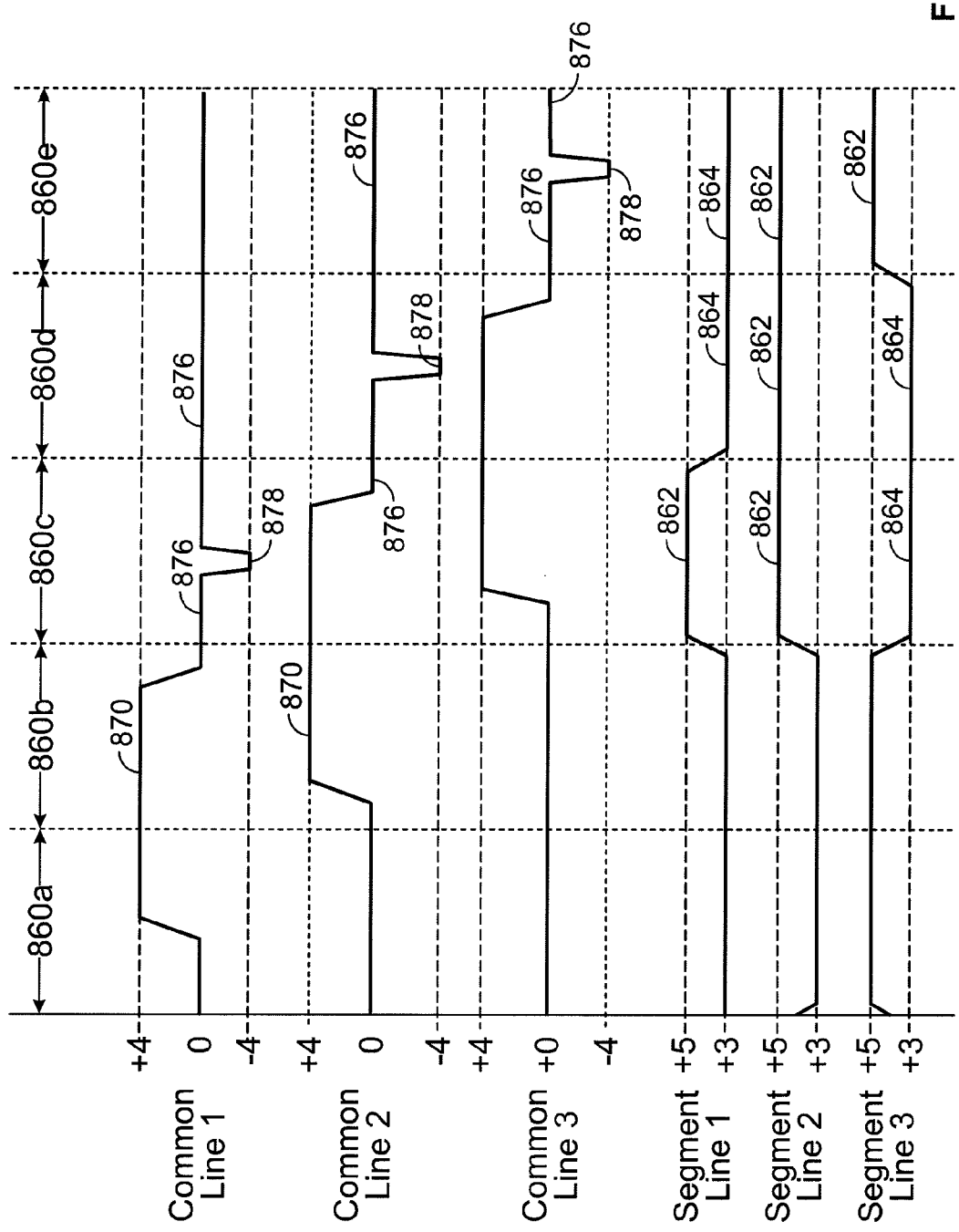
FIG. 10 shows an example of a timing diagram for row and column signals that may be used to write a frame of display data to the 3×3 interferometric modulator display of FIG. 2.

FIG. 10 shows an example of a timing diagram for row and column signals that may be used to write a frame of display data to the 3×3 interferometric modulator display of FIG. 2. The series of common and segment voltage signals will result in the display arrangement illustrated in FIG. 4A, where actuated modulators are non-reflective and illustrated as dark. Prior to writing the frame illustrated in FIG. 4A, the pixels can be in any state, but the write procedure illustrated in the timing diagram of FIG. 10 releases each modulator in a given common line prior to addressing the common line. In the example implementation illustrated in FIG. 10, the address voltage 878 is −4 volts, the hold voltage 876 is 0 volts, and the release voltage 870 is +4 volts. Also, the high segment voltage 862 is +5 volts and the low segment voltage 864 is +3 volts. Further, as discussed above and as shown in FIG. 9, the hysteresis window for the interferometric modulators in this example is of 2-6 volts. The voltage applied to the interferometric modulators is calculated as the difference between the common line voltage and the segment line voltage applied to each interferometric modulator, or the absolute difference between the values as the values are being measured with respect to ground. Thus, applying a common line voltage of 0 volts and a segment line voltage of either +5 or +3 volts to an interferometric modulator results in a voltage applied across or to the interferometric modulator which is within the hysteresis window.

Prior to the first line time 860a, none of common lines 1, 2 or 3 are being addressed. During the first line time 860a, a release voltage 870 is initially applied on common line 1; the voltage applied on common line 2 begins at a high hold voltage 872 and moves to a release voltage 870; and a low hold voltage 876 is applied along common line 3. Thus, the modulators at the intersection of common and segment lines (referenced hereafter in the format of (common, segment), e.g. the intersection of common line 1 and segment line 1 is (1,1)), (1,1), (1,2), and (1,3) along common line 1 begin to enter a relaxed state if they were previously actuated. The modulators (2,1), (2,2), and (2,3) along common line 2 and the modulators (3,1), (3,2), and (3,3) along common line 3 will remain in their previous state during line time 860a. The segment voltages applied along segment lines 1, 2 and 3 will have no effect on the state of the interferometric modulators.

During the second line time 860b, the voltage on common line 1 moves to a hold voltage 876, and all modulators along common line 1 remain in a relaxed state regardless of the segment voltage applied. The voltage on common line 2 transitions to the release voltage 870, therefore modulators along common line 2 begin to enter a relaxed state. The modulators (3,1), (3,2), and (3,3) along common line 3 remain in their previous positions.

During the third line time 860c, common line 1 is addressed by applying address voltage 878 on common line 1. Because a high segment voltage 862 of +5 volts is applied along segment lines 1 and 2 during the application of this address voltage, the pixel voltage across modulators (1,1) and (1,2) is 9 volts. Because a low segment voltage 864 is applied along segment line 3, the pixel voltage across modulator (1,3) is 7 volts. Both the 7 volts and the 9 volts, if applied for sufficient period of time, will cause the modulators to actuate. However, as discussed above, modulators (1,1) and (1,2), which have a higher pixel voltage applied, actuate faster than modulator (1,3). The duration of the address voltage 878 is selected to be sufficient to actuate modulators (1,1) and (1,2) (i.e., greater than the mechanical response time of the modulators (1,1) and (1,2)), but is not sufficient to actuate modulator (1,3) (i.e., less than the mechanical response time of the modulators (1,3)), which then remains relaxed. Accordingly, the duration of the pulse in this example and subsequent examples may be any value greater than the mechanical response time of the modulators to be actuated and less then the mechanical response time of the modulators not to be actuated. For example, where the mechanical response time of the modulators to be actuated is 20 μsec, and the mechanical response time of the modulators not to be actuated is 60 μsec, the duration of the pulse may be any value equal to or greater that 20 μsec but less than 60 μsec. Also during line time 860c, the voltage along common line 2 decreases to a hold voltage 876, and the voltage along common line 3 transitions to a release voltage 870, leaving the modulators along common line 2 in a relaxed position and beginning the transition of actuated modulators in common line 3 to a relaxed position.

During the fourth line time 860d, the voltage on common line 1 is at a hold voltage 870, leaving the modulators along common line 1 in their respective addressed states. Common line 2 is now addressed by decreasing the voltage on common line 2 to address voltage 878 for a period of time (e.g., as low as 20 μsec as discussed above) within fourth line time 860d. Because a low segment voltage 864 is applied along segment line 2, the pixel voltage across modulator (2,2) is 9 volts. Because a low segment voltage 864 is applied along segment lines 1 and 3, the pixel voltage across modulators (2,1) and (2,3) is 7 volts. As discussed with respect to third line time 860c, the duration of the address voltage 878 is sufficient to actuate modulator (2,2), but is not sufficient to actuate modulators (2,1) and (2,3), which remain relaxed. The voltage on common line 3 transitions to a hold voltage 870, leaving the modulators along common line 3 in a relaxed state.

Finally, during the fifth line time 860e, the voltage on common line 1 remains at hold voltage 870, and the voltage on common line 2 remains at a hold voltage 870, leaving the modulators along common lines 1 and 2 in their respective addressed states. The voltage on common line 3 transitions to address voltage 878 for a time period (e.g., 21 μsec as discussed above) within the fifth line time 860e to address the modulators along common line 3. As a high segment voltage 862 is applied on segment lines 2 and 3, the pixel voltage across the modulators (3,2) and (3,3) is 9 volts. As a low segment voltage 864 is applied along segment line 1, the pixel voltage across modulator (3,1) is 7 volts. As discussed with respect to third line time 860c, the duration of the address voltage 878 is sufficient to actuate modulators (3,2) and (3,3), but is not sufficient to actuate modulator (3,1), which remains relaxed. Thus, at the end of the fifth hold time 860e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In this example, common lines 1, 2 and 3 may start each line time with voltage levels that may or may not vary from each other. Segment lines 1, 2 and 3 may start each line time with voltage levels that may or may not vary from each other. In this example, common and segment line voltages may be both above (positive), below (negative) and at 0. Variations of this that are consistent with this description would be apparent to a person having ordinary skill in the art.

Figure 11:
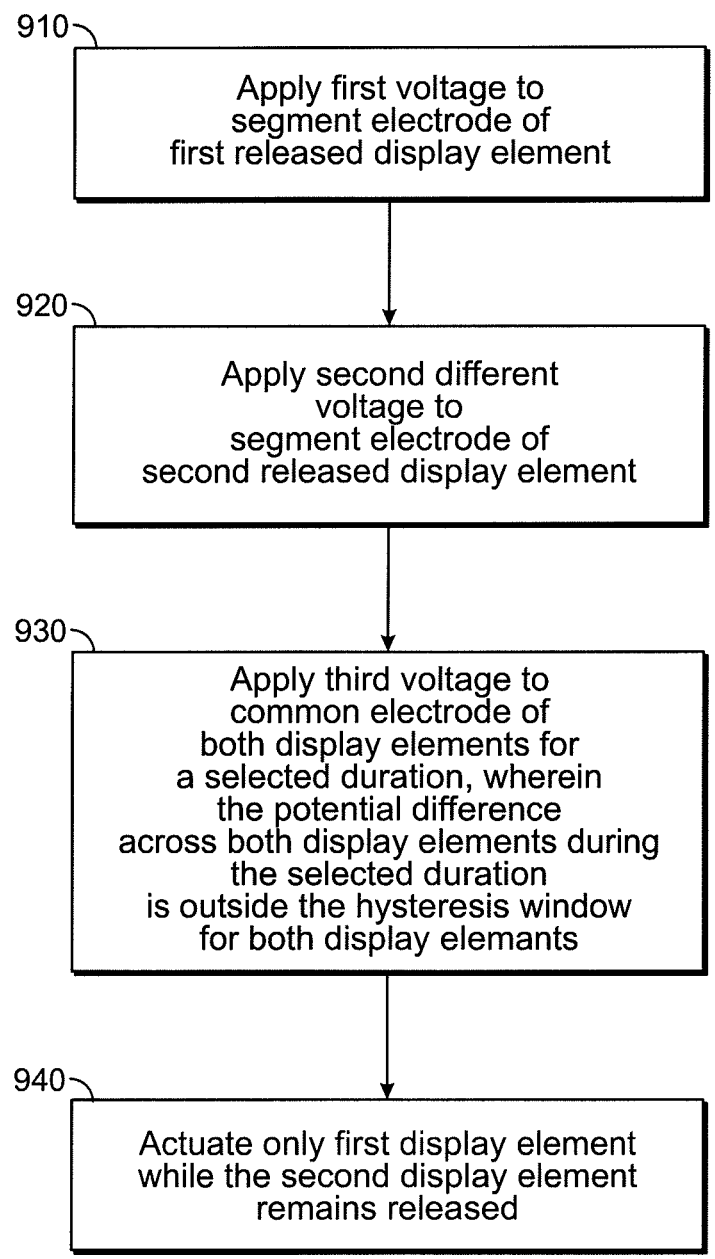
FIG. 11 shows an example of a flow diagram illustrating a process for addressing a plurality of display elements.

FIG. 11 shows an example of a flow diagram illustrating a process for addressing a plurality of display elements. In this implementation, at block 910 a first voltage is applied to a segment electrode of a first released display element. At block 920, a second different voltage is applied to the segment electrode of a second released display element. These segment voltages may, for example, correspond to the +5 and +3 volt levels described above with reference to FIG. 10. At block 930, a third voltage is applied to a common electrode of both display elements for a selected duration. This may be, for example, the −4 volt addressing voltage of FIG. 10. When this addressing voltage is applied, the voltage across both display elements is outside the hysteresis window for both display elements. At block 940, the first display element is actuated, while the second display element remains released.

Figure 12:
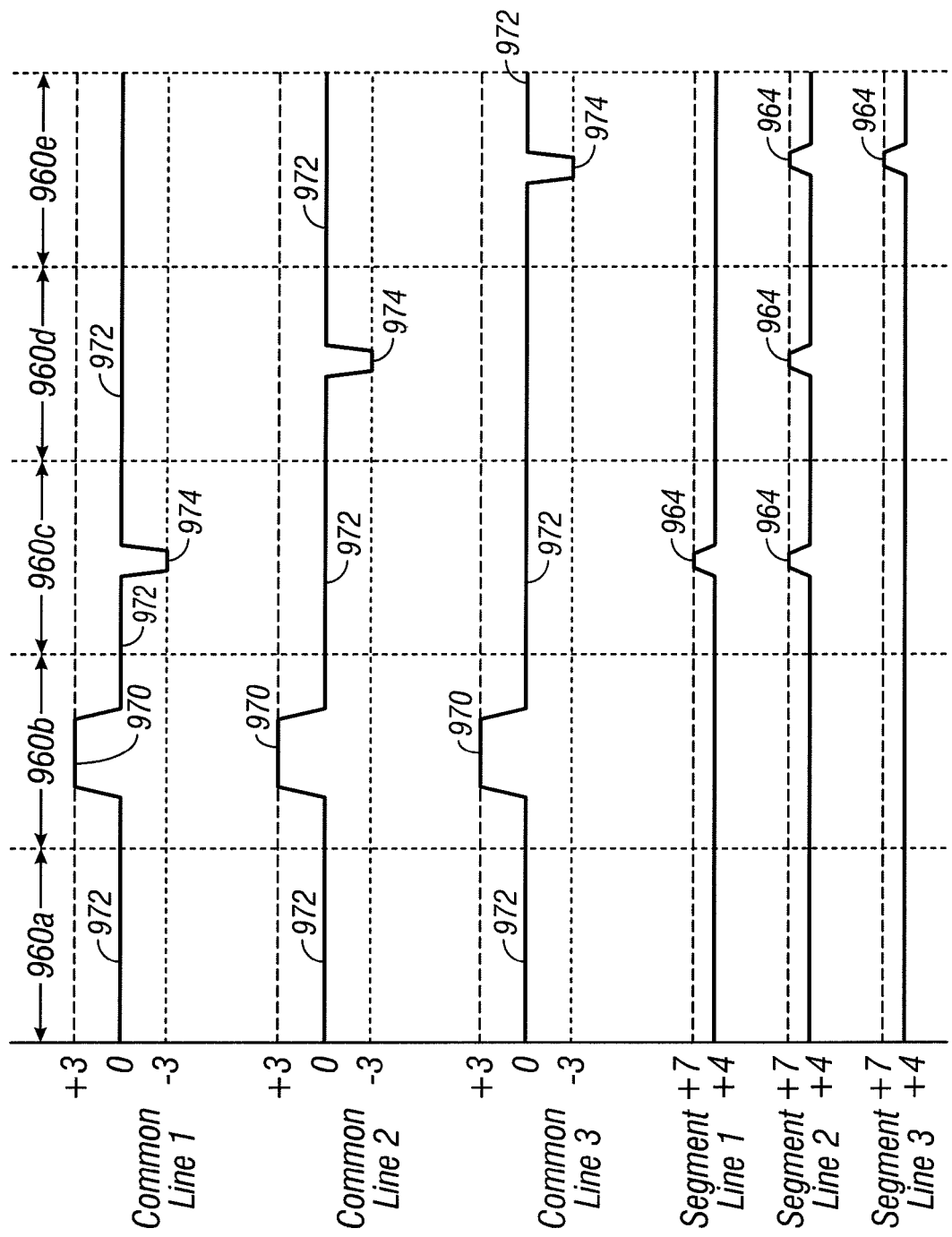
FIG. 12 shows an example of another timing diagram for row and column signals that may be used to write a frame of display data to the 3×3 interferometric modulator display of FIG. 2.
Figure 13A:
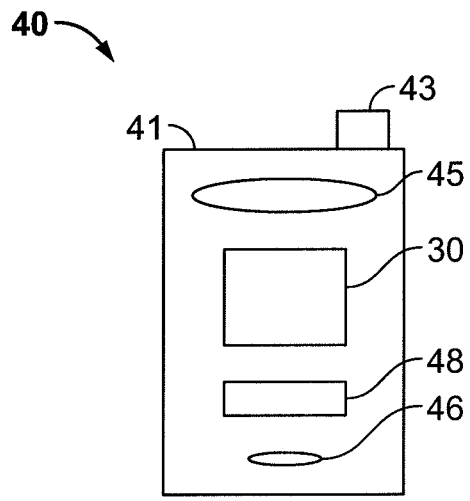
FIGS. 13A and 13B show examples of system block diagrams illustrating a display device that includes a plurality of interferometric modulators.
Figure 13B:
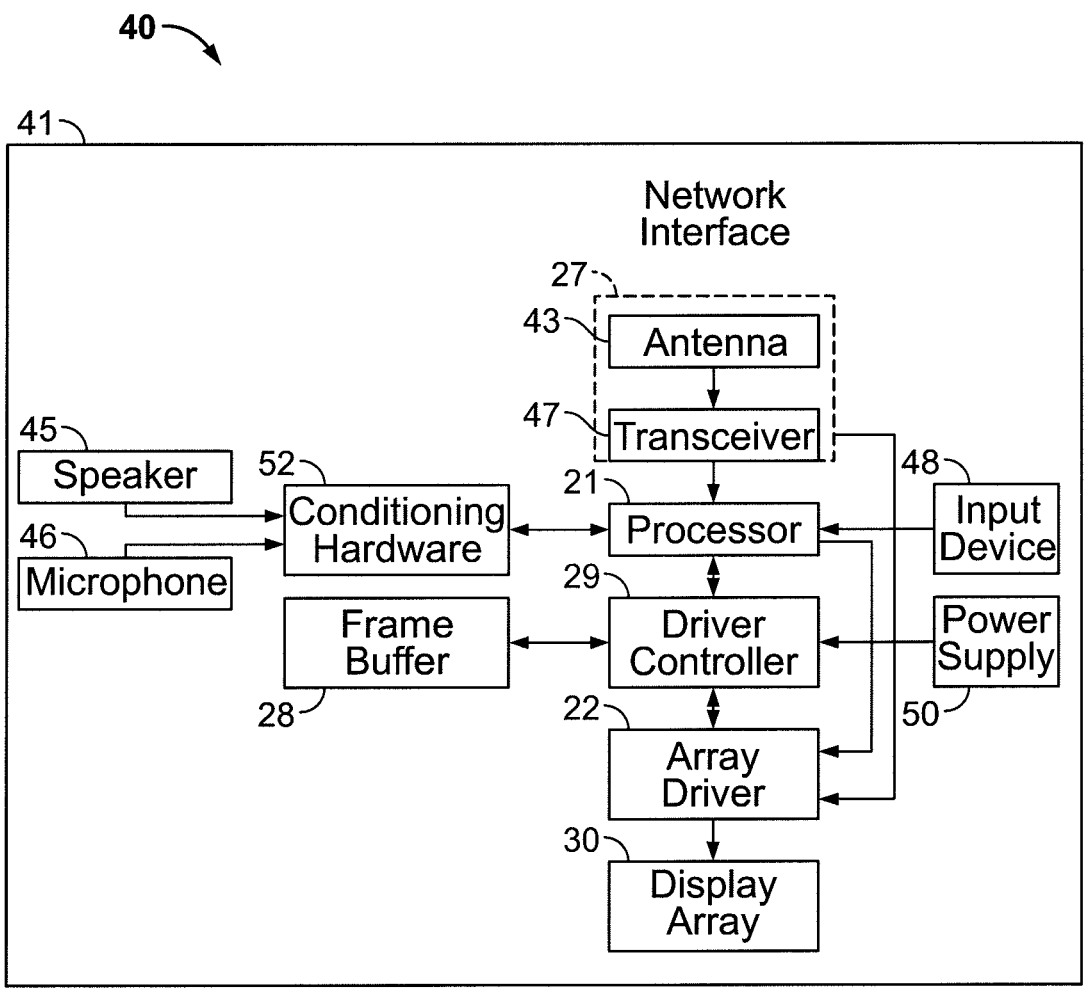

FIG. 12 shows an example of another timing diagram for row and column signals that may be used to write a frame of display data to the 3×3 interferometric modulator display of FIG. 2. The series of common and segment voltage signals will result in the display arrangement illustrated in FIG. 4A, where actuated modulators are non-reflective and illustrated as dark. In the example implementation illustrated in FIG. 10, actuated modulators in a given common line were exposed to 9 volts, and unactuated modulators in the line were exposed to 7 volts. In the example implementation illustrated in FIG. 12, actuated pixels in a given common line are exposed to 10 volts, and unactuated pixels are exposed to 7 volts. Using 10 volts to actuate rather than 9 volts can enable an even faster actuation and shorter line time than the example implementation illustrated in FIG. 10. As discussed above, the duration of the pulse is selected to be greater than a mechanical response time of interferometric modulators to be actuated and less than a mechanical response time of the remaining interferometric modulators in a given row. Accordingly, only the interferometric modulators to be actuated are actuated, while not affecting the remaining interferometric modulators in the row. For example, the mechanical response time of interferometric modulators applied 7 volts may be 50 μsec, while the mechanical response time of interferometric modulators applied 10 volts may be 15 μsec. Accordingly, the duration of the pulse is selected to be greater than 15 μsec and less than 50 μsec, such as 16 μsec.

Further, as discussed above, the hysteresis window for the interferometric modulators in this example is of 2-6 volts. The voltage applied to the interferometric modulators is calculated as the difference between the common line voltage and the segment line voltage applied to each interferometric modulator, or the absolute difference between the values as the values are being measured with respect to ground. Thus, applying a common line voltage of 0 volts and a segment line voltage of +4 volts to an interferometric modulator results in a voltage of 4 volts applied across or to the interferometric modulator, which is within the hysteresis window.

As with the example implementation illustrated in FIG. 10, prior to writing the frame illustrated in FIG. 4A, the pixels can be in any state, but the write procedure illustrated in the timing diagram of FIG. 12 releases each modulator prior to addressing the modulator. Further, all of the modulators are released during the same line time. In the example implementation illustrated in FIG. 12, the address voltage 974 is −3 volts, the high hold voltage 972 is 0 volts, the release voltage 970 is +3 volts.

Prior to the first line time 960a, none of common lines 1, 2 or 3 are being addressed. During the first line time 960a, a hold voltage 972 is applied to each of the common lines, with a voltage of +4 volts applied to the segment lines. Therefore, each interferometric modulator in the array receives a voltage differential of 4 volts and thus remains in its previous state.

During the second line time 960b, the voltage on each of the common lines moves to a release voltage 970 with a voltage of +3 volts applied to the segment lines. Therefore, each interferometric modulator in the array experiences a voltage differential of 1 volt and thus moves to a relaxed state.

During the third line time 960c, common line 1 is addressed by an address voltage 974 for a portion of line time 960c (e.g., for 16 μsec as discussed above). Because a high segment voltage 964 of +7 volts is applied along segment lines 1 and 2 during the application of this address voltage, the pixel voltage across modulators (1,1) and (1,2) is 10 volts. Because +4 volts remains applied along segment line 3, the pixel voltage across modulator (1,3) is only 7 volts. Both the 10 volts and the 7 volts, if applied for a sufficient time period, will cause the modulators to actuate. However, as discussed above, modulators (1,1) and (1,2), which have a higher pixel voltage applied, actuate faster (e.g., after 15 μsec as discussed above) than modulator (1,3) (e.g., which actuates after 50 μsec as discussed above). The duration of the address voltage 974 is selected to be sufficient to actuate modulators (1,1) and (1,2), but is not sufficient to actuate modulator (1,3), which remains relaxed.

During the fourth line time 960d, the voltage on common line 1 is at hold voltage 972, leaving the modulators along common line 1 in their respective addressed states. Common line 2 is now addressed by transitioning the voltage on common line 2 to an address voltage 974. Because a high segment voltage 964 is applied along segment line 2, the pixel voltage across modulator (2,2) is 10 volts. Because a voltage of +4 volts is applied along segment lines 1 and 3, the pixel voltage across modulators (2,1) and (2,3) is 7 volts. As discussed with respect to third line time 960c, the duration (e.g., 16 μsec as discussed above) of the address voltage 974 is sufficient to actuate modulator (2,2), but is not of sufficient duration to actuate modulators (2,1) and (2,3), which remain relaxed. The voltage on common line 3 is at a hold voltage 972, leaving the modulators along common line 3 in their respective previously relaxed states.

Finally, during the fifth line time 960e, the voltage on common line 1 remains at hold voltage 972, and the voltage on common line 2 remains at a hold voltage 972, leaving the modulators along common lines 1 and 2 in their respective addressed states. The voltage on common line 3 transitions to an address voltage 974 to address the modulators along common line 3. As a high segment voltage 964 is applied on segment lines 2 and 3, the pixel voltage across the modulators (3,2) and (3,3) is 10 volts. As a low segment voltage of +4 volts is applied along segment line 1, the pixel voltage across modulator (3,1) is 7 volts. As discussed with respect to third line time 960c, the duration (e.g., 16 μsec as discussed above) of the address voltage 974 is sufficient to actuate modulators (3,2) and (3,3), but is not sufficient to actuate modulator (3,1), which remains relaxed. Thus, at the end of the fifth hold time 960e, the 3×3 pixel array is in the state shown in FIG. 4A, and will remain in that state as long as the hold voltages are applied along the common lines, regardless of variations in the segment voltage which may occur when modulators along other common lines (not shown) are being addressed.

In this example, common lines 1, 2 and 3 start each line time at the same voltage level, and segment lines 1, 2 and 3 start each line time at the same voltage level. In this example, common line voltages are 0 and above (positive), while segment line voltages are 0 and below (negative). Variations of this that are consistent with this description would be apparent to one having ordinary skill in the art.

Using the shorter addressing pulses described above, line times can be reduced from greater than, or approximately 50 μsec to less than approximately 20 μsec based on the fact that pulse duration to actuate the interferometric modulators can be reduced to approximately 16 μsec.

FIGS. 12A and 12B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 12B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for addressing a plurality of display elements comprising:
    applying a first potential to a segment electrode of a first display element;
    applying a second potential different from the first potential to a segment electrode of a second display element;
    applying a third potential to a common electrode of both display elements for a selected duration;
    wherein a potential difference produced across the first and second display elements during the selected duration has an amplitude and duration greater than a response threshold of the first display element and less than a response threshold of the second display element, wherein the response threshold of the first display element is based at least in part on the first potential applied to the segment electrode of the first display element, and wherein the response threshold of the second display element is based at least in part on the second potential applied to the segment electrode of the second display element; and wherein the potential difference across the first display element during the selected duration has an amplitude outside of a first hysteresis window of the first display element and wherein the potential difference across the second display element during the selected duration has an amplitude outside a second hysteresis window of the second display element.

2. The method of claim 1, wherein a gap between the common electrode and the segment electrode of the first display element is based at least in part on the first potential applied to the segment electrode of the first display element, and wherein a gap between the common electrode and segment electrode of the second display element is based at least in part on the second potential applied to the segment electrode of the second display element, and wherein both the first display element and the second display element are in a relaxed state prior to applying the third potential to the common electrodes of both the first and second display elements.

3. The method of claim 1, wherein the first hysteresis window is approximately equal to the second hysteresis window.

4. The method of claim 1, wherein the response threshold of the first display element is a first mechanical response time and the response threshold of the second display element is a second mechanical response time.

5. The method of claim 1, wherein a state of the second display element is maintained, and wherein a state of the first display element is changed.

6. The method of claim 1, further comprising:
receiving an image data signal; and
setting the state of each of the first and second display elements based, at least in part, on the image data signal.

7. A display apparatus comprising:
a plurality of display elements including at least a first and second display element; and
a driver circuit configured to:
generate a first pulse characterized by a parameter having a value greater than a response threshold of the first display element and less than a response threshold of the second display element, wherein the response threshold of the first display element is based at least in part on a first hold voltage applied to the first display element, and wherein the response threshold of the second display element is based at least in part on a second hold voltage applied to the second display element; and
apply the first pulse to the plurality of display elements, wherein the pulse has an amplitude outside of a first hysteresis window of the first display element and outside a second hysteresis window of the second display element.

8. The display apparatus of claim 7, wherein the driver circuit is configured to apply the first pulse to the plurality of display elements by applying the pulse having the pulse voltage at an electrode of the first display element and the second display element.

9. The display apparatus of claim 7, wherein the first display element comprises a first electrode and a second electrode, wherein a gap between the first electrode and the second electrode is based at least in part on the first hold voltage applied to the first display element, wherein the second display element comprises a third electrode and a fourth electrode, wherein a gap between the third electrode and the fourth electrode is based at least in part on the second hold voltage applied to the second display element, and wherein both the first display element and the second display element are in a relaxed state prior to applying the first pulse.

10. The display apparatus of claim 7, wherein the first hysteresis window is approximately equal to the second hysteresis window.

11. The display apparatus of claim 7, wherein the parameter comprises a duration of the pulse, and wherein the response threshold of the first display element is a first mechanical response time and the response threshold of the second display element is a second mechanical response time.

12. The display apparatus of claim 7, wherein a state of the second display element is maintained, and wherein a state of the first display element is changed.

13. The display apparatus of claim 7, wherein the driver circuit is further configured to:
receive an image data signal; and
set the state of each of the first and second display elements based, at least in part, on the image data signal.

14. A display apparatus comprising:
means for generating a first pulse characterized by a parameter having a value greater than a response threshold of a first display element and less than a response threshold of a second display element, wherein the response threshold of the first display element is based at least in part on a first hold voltage applied to the first display element, and wherein the response threshold of the second display element is based at least in part on a second hold voltage applied to the second display element; and
means for applying the first pulse to the first display element and the second display element, wherein the pulse has an amplitude outside of a first hysteresis window of the first display element and outside a second hysteresis window of the second display element.

15. The display apparatus of claim 14, further comprising means for applying the pulse having the pulse voltage at an electrode of the first display element and the second display element.

16. The display apparatus of claim 14, wherein the first display element comprises a first electrode and a second electrode, wherein a gap between the first electrode and the second electrode is based at least in part on the first hold voltage applied to the first display element, wherein the second display element comprises a third electrode and a fourth electrode, wherein a gap between the third electrode and the fourth electrode is based at least in part on the second hold voltage applied to the second display element, and wherein both the first display element and the second display element are in a relaxed state prior to applying the first pulse.

17. The display apparatus of claim 14, wherein the first hysteresis window is approximately equal to the second hysteresis window.

18. The display apparatus of claim 14, wherein the parameter comprises a duration of the pulse, and wherein the response threshold of the first display element is a first mechanical response time and the response threshold of the second display element is a second mechanical response time.

19. The display apparatus of claim 14, wherein a state of the second display element is maintained, and wherein a state of the first display element is changed.

20. The display apparatus of claim 14, further comprising:
means for receiving an image data signal; and
means for setting the state of each of the first and second display elements based, at least in part, on the image data signal.

21. A method for addressing a plurality of display elements, the method comprising:

setting each segment electrode voltage in a line of display elements to one of first and second different voltage levels;

strobing a common electrode of the line of display elements with a voltage pulse;

wherein the common electrode voltage pulse has an amplitude and duration such that when applied to a display element with a segment voltage at the first level the display element does not actuate, and when applied to a display element with a segment voltage at the second level the display element does actuate, and further wherein the common electrode voltage pulse has an amplitude that would actuate both elements if applied for a sufficiently long duration.

22. The method of claim 21, comprising releasing all the display elements in the line prior to strobing the common electrode.

\* \* \* \* \*